Sept. 13, 1932.　　　　F. STEPHENSON　　　　1,877,075
LICENSE PLATE HOLDER
Filed Sept. 5, 1931
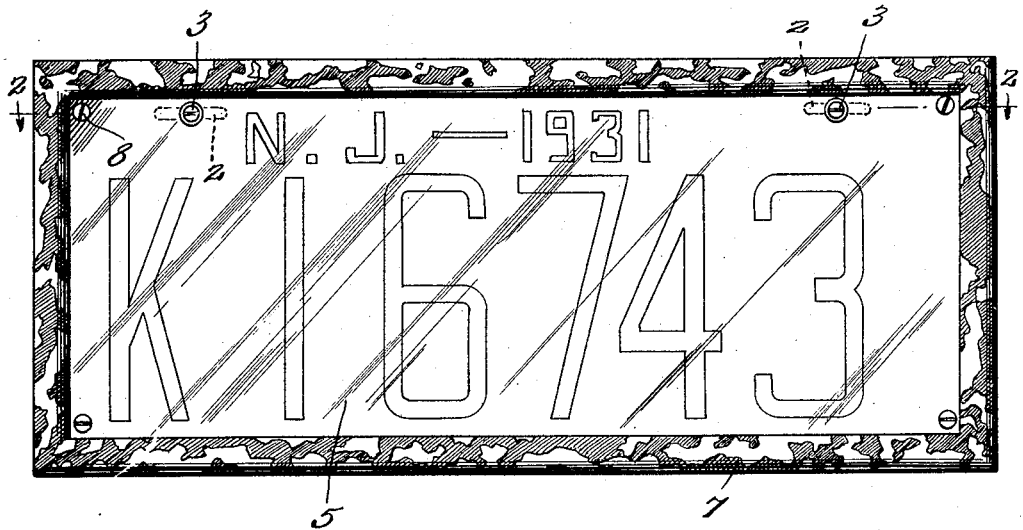
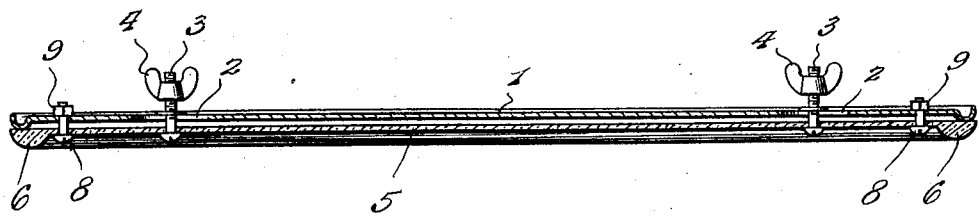
Inventor
F. Stephenson.
By Lacey & Lacey, Attorneys Patented Sept. 13, 1932

1,877,075

UNITED STATES PATENT OFFICE

FRANK STEPHENSON, OF PISCATWAY, WEST NEW BRUNSWICK, NEW JERSEY

LICENSE PLATE HOLDER

Application filed September 5, 1931. Serial No. 561,484.

This invention has for its object the provision of means whereby an automobile license plate may be easily kept in a clean condition and will be protected against the weather and will be always readable. The invention also seeks to provide a cover for an automobile license plate which will be somewhat ornamental and which will be very cheap and easily produced. The invention is illustrated in the accompanying drawing and will be hereinafter fully set forth.

In the drawing:

Figure 1 is an elevation of a license plate holder embodying the invention,

Fig. 2 is a section on the line 2—2 of Fig. 1.

The license plate 1 is of the usual form and provided with longitudinal slots 2 through which fastening bolts 3 are passed to secure the plate upon an automobile, the bolts 3 being equipped with wing nuts on their inner or rear ends, as is usual, adapted to be turned home against the suspending bracket of the automobile so that the plate will be firmly clamped thereon. My invention provides a plate 5 of celluloid, or similar material, of the same dimensions and form as the license plate whereby it may be placed against the face of the license plate and entirely cover the same, as will be understood upon reference to the drawing, the bolts 3, in the present instance, passing through the plate 5 to aid in supporting the same. The body of the plate 5 is clear or transparent so that all of the indicia upon the license plate may be easily read and the edge portion of the plate is thickened, as shown at 6, so that the plate will be reinforced and will not readily chip or split at any point upon any of its edges. This enlarged bordering edge portion may be of any desired relative size or shape and may be given any desired ornamentation, as indicated at 7, so that the plate will have an attractive appearance, and, by having the edges thickened, said portions will be rendered relatively opaque so that a contrast is provided between the edge or rim portions and the clear body portion of the plate which will aid in the reading of the indicia upon the license plate. At the corners of the plate 5, and as close within the angles of the edge portion as possible, openings are formed through the plate to receive bolts 8 which pass through the license plate and are equipped with nuts 9 on their inner ends to be turned home against the license plate whereby the cover will be firmly secured thereto.

By providing a cover of the character shown and described, the license plate is protected from the weather and an ornamental appearance is given to an article which ordinarily is considered only from a utilitarian standpoint. By thickening the edge portions of the plate, a resistance to bending at the point of engagement with the edge portions of the license plate is attained so that bending or splitting of the cover around the bolts or screws which secure it to the license plate will be avoided.

Having thus described the invention, I claim:

A cover for license plates consisting of a sheet of clear celluloid of the same form and dimensions as a standard license plate and having its edge portions increased in thickness to be relatively opaque and ornamented to contrast with the clear area of the sheet, the back of the sheet being entirely in one plane to rest flat against the edges of the license plate, means for securing the sheet to a license plate, and means for securing the sheet and license plate upon a vehicle.

In testimony whereof I affix my signature.

FRANK STEPHENSON. [L. S.]